US007685464B2

(12) United States Patent
Kimmery et al.

(10) Patent No.: US 7,685,464 B2
(45) Date of Patent: Mar. 23, 2010

(54) ALTERNATING FAULT TOLERANT RECONFIGURABLE COMPUTING ARCHITECTURE

(75) Inventors: Clifford E. Kimmery, Clearwater, FL (US); Grant L. Smith, Tampa, FL (US); Richard P. White, Seminole, FL (US)

(73) Assignee: Honeywell International Inc., Morristown, NJ (US)

( * ) Notice: Subject to any disclaimer, the term of this patent is extended or adjusted under 35 U.S.C. 154(b) by 621 days.

(21) Appl. No.: 11/561,500

(22) Filed: Nov. 20, 2006

(65) Prior Publication Data

US 2008/0120500 A1 May 22, 2008

(51) Int. Cl.
*G06F 11/00* (2006.01)
(52) U.S. Cl. .......................................... 714/13; 714/11
(58) Field of Classification Search ........................ None
See application file for complete search history.

(56) References Cited

U.S. PATENT DOCUMENTS

| 4,413,327 | A | | 11/1983 | Sabo et al. |
|---|---|---|---|---|
| 4,644,498 | A | | 2/1987 | Bedard et al. |
| 5,361,373 | A | * | 11/1994 | Gilson ............................ 712/1 |
| 5,502,812 | A | | 3/1996 | Leyre et al. |
| 5,655,069 | A | | 8/1997 | Ogawara et al. |
| 6,104,211 | A | * | 8/2000 | Alfke ........................... 326/91 |
| 6,178,522 | B1 | | 1/2001 | Zhou et al. |
| 6,219,785 | B1 | * | 4/2001 | Smith ............................ 713/1 |
| 6,856,600 | B1 | | 2/2005 | Russell et al. |
| 6,973,608 | B1 | | 12/2005 | Abramovici et al. |
| 6,996,443 | B2 | * | 2/2006 | Marshall et al. ............... 700/87 |
| 7,036,059 | B1 | * | 4/2006 | Carmichael et al. ......... 714/725 |
| 7,340,596 | B1 | * | 3/2008 | Crosland et al. ............ 713/100 |
| 7,467,326 | B2 | * | 12/2008 | Hillman et al. .............. 714/11 |
| 7,539,914 | B1 | * | 5/2009 | Sundararajan et al. ...... 714/725 |
| 2002/0016942 | A1 | | 2/2002 | MacLaren et al. |
| 2002/0116683 | A1 | | 8/2002 | Mitra et al. |
| 2003/0041290 | A1 | | 2/2003 | Peleska |
| 2003/0167307 | A1 | | 9/2003 | Filepp et al. |
| 2004/0078508 | A1 | | 4/2004 | Rivard |
| 2005/0027409 | A1 | | 2/2005 | Marshall et al. |
| 2005/0268061 | A1 | | 12/2005 | Vogt |
| 2005/0278567 | A1 | | 12/2005 | Wolfe et al. |
| 2006/0020852 | A1 | | 1/2006 | Bernick et al. |

(Continued)

FOREIGN PATENT DOCUMENTS

WO 2006052397 5/2006

(Continued)

OTHER PUBLICATIONS

Hulme et al., "Configurable Fault-Tolerant Processor (CFTP) for Spacecraft Onboard Processing", 2004, IEEE.*

(Continued)

*Primary Examiner*—Gabriel L Chu
(74) *Attorney, Agent, or Firm*—Fogg & Powers LLC

(57) ABSTRACT

A method for reducing radiation effects in an electronic circuit is disclosed. The method involves periodically transferring operation of the electronic circuit to at least one alternate processing element of a plurality of processing elements. With the at least one alternate processing element in control, the method reconfigures one or more processing elements of the plurality of processing elements. Once the one or more processing elements are reconfigured, the method synchronizes the one or more processing elements with the at least one alternate processing element.

9 Claims, 3 Drawing Sheets

U.S. PATENT DOCUMENTS

2006/0020774 A1    6/2006    Ramos et al.
2006/0117164 A1*   6/2006    Coxe et al. .................... 712/15

OTHER PUBLICATIONS

European Patent Office, "European Search Report", Apr. 2, 2008, Published in: EP.

Lafferty et al., "U.S. Appl. No. 11/458,316, Local Controller for Reconfigurable Processing Elements", filed Jul. 18, 200, Published in: US.

Ramacciotti et al., "Digital Design of Complex Systems: Methodology and Tools for the Dynamic Reconfiguration of FPGA Applied to a Real World", 2003, Publisher: Universita Degli Studi Di Pisa, pp. 8-10 and 86-115.

Smith et al., "Techniques to Enable FPGA Based Reconfigurable Fault Tolerant Space Computing", "IEEE", Dec. 9, 2005, pp. 1-11, No. 1592.

* cited by examiner

ALTERNATING FAULT TOLERANT RECONFIGURABLE COMPUTING ARCHITECTURE

RELATED APPLICATIONS

This application is related to commonly assigned and co-pending U.S. patent application Ser. No. 11/348,277, filed on Feb. 6, 2006 and entitled "FAULT TOLERANCE IN A DISTRIBUTED PROCESSING NETWORK" (the '277 Application) and U.S. patent application Ser. No. 11/348,290, filed on Feb. 6, 2006 and entitled "FAULT TOLERANT COMPUTING SYSTEM" (the '290 Application). The '277 and '290 Applications are incorporated herein by reference.

BACKGROUND

Present and future high-reliability (that is, space) missions require significant increases in on-board signal processing. Presently, generated data is not transmitted via downlink channels in a reasonable time. As users of the generated data demand faster access, increasingly more data reduction or feature extraction processing is performed directly on the high-reliability vehicle (for example, spacecraft) involved. Increasing processing power on the high-reliability vehicle provides an opportunity to narrow the bandwidth for the generated data and/or increase the number of independent user channels.

In signal processing applications, traditional instruction-based processor approaches are unable to compete with million-gate, field-programmable gate array (FPGA)-based processing architectures. Systems with multiple FPGA-based processors are required to meet computing needs for Space Based Radar (SBR), next-generation adaptive beam forming, and adaptive modulation space-based communication programs. As the name implies, an FPGA-based system is easily reconfigured to meet new requirements. FPGA-based reconfigurable processing architectures are also re-useable and able to support multiple space-based communication programs with relatively simple changes to their unique data interfaces.

Existing commercial-off-the-shelf (COTS), synchronous read-only memory (SRAM)-based processing elements are sensitive to radiation-induced upsets. Consequently, traditional COTS-based reconfigurable systems are unreliable in high-radiation environments. Furthermore, existing diagnostic approaches for detecting and mitigating susceptibilities to one or more single event upsets (SEUs), single event functional interrupts (SEFIs) and single event transients (SETs) have several disadvantages, particularly with respect to partial reconfiguration. Partial reconfiguration involves replacing (restoring) dynamic memory register contents with new (existing) processing configurations while leaving static memory register contents intact. Current methods of partial reconfiguration remove radiation effects in dynamic memory portions of the processing system while (potentially) leaving static memory portions with accumulated radiation over a significant time period.

SUMMARY

The following specification addresses an alternating fault tolerant reconfigurable computing architecture for electronic systems. Particularly, in one embodiment, a method for reducing radiation effects in an electronic circuit is provided. The method involves periodically transferring operation of the electronic circuit to at least one alternate processing element of a plurality of processing elements. With the at least one alternate processing element in control, the method reconfigures one or more processing elements of the plurality of processing elements. Once the one or more processing elements are reconfigured, the method synchronizes the one or more processing elements with the at least one alternate processing element.

DRAWINGS

These and other features, aspects, and advantages will be better understood with regard to the following description, appended claims, and accompanying drawings where:

DETAILED DESCRIPTION

Figure 1:
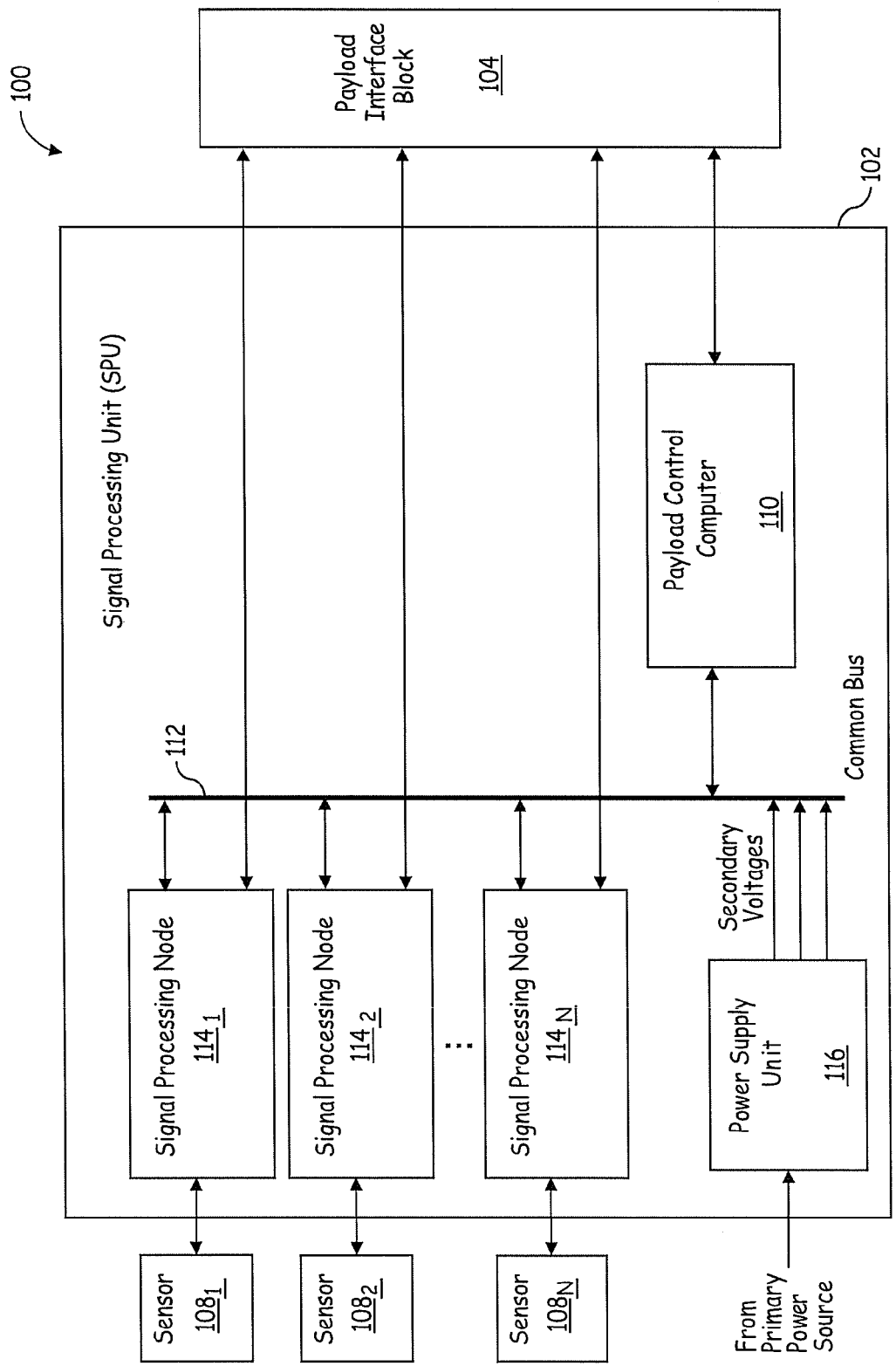
FIG. 1 is a block diagram of an embodiment of an electronic system incorporating an alternating fault tolerant reconfigurable computing architecture.

FIG. 1 is a block diagram of an embodiment of an electronic system 100. The system 100 comprises a signal processing unit 102, a payload interface block 104 responsive to the signal processing unit 102, and sensors $108_1$ to $108_N$ coupled to the signal processing unit 102. The signal processing unit 102 further includes signal processing nodes $114_1$ to $114_N$, a payload control computer 110, a power supply unit 116, and a common interface bus 112. In one implementation of the system 100, the common interface bus 112 is, without limitation, a compact peripheral component interconnect (cPCI) bus. In the same or alternate implementations, each of the sensors 108 is individually coupled to a respective signal processing node 114. In the example embodiment of FIG. 1, each of the sensors 108 is, without limitation, at least one of a visible focal plane array, a guidance sensor, and an infrared focal plane array. It is understood that the system 100 is capable of accommodating any appropriate number and type of the sensors $108_1$ to $108_N$ and the signal processing nodes $114_1$ to $114_N$ (for example, one or more sensors 108 coupled to one or more signal processing nodes 114 in a single signal processing unit 102) for communication with the payload interface block 104.

In operation, a plurality of reconfigurable processing elements in each of the signal processing nodes $114_1$ to $114_N$ periodically alternate between reconfiguration and signal processing to maintain operational time continuity of the signal processing unit 102. The periodic alternating reconfiguration substantially eliminates radiation effects on the signal processing unit 102, as discussed in further detail below with respect to FIG. 2, by preventing an accumulation of radiation in the plurality of reconfigurable processing elements in each of the signal processing nodes $114_1$ to $114_N$. The sensors $108_1$ to $108_N$ collect raw payload data (for example, spacecraft communications signals) for signal processing by the signal processing nodes $114_1$ to $114_N$. The payload interface block 104 receives the processed payload data from the signal processing nodes $114_1$ to $114_N$. The, at least one, payload control computer 110 communicates with the one or more signal processing nodes $114_1$ to $114_N$ over the common interface bus 112. The at least one payload control computer 110 also issues payload control commands to the payload interface block 104. The power supply unit 116 supplies a plurality of secondary power signals (voltages) to the signal processing nodes $114_1$ to $114_N$ and to the at least one payload control computer 110 over the common interface bus 112.

The signal processing nodes $114_1$ to $114_N$ comprise symmetrical reconfigurable processing elements (that is, reconfigurable processing elements with comparable capabilities and features) that enhance mitigation efforts in the reduction of radiation effects on the signal processing unit 102. The signal processing nodes $114_1$ to $114_N$ reconfigure each of the symmetrical reconfigurable processing elements (described in further detail below with respect to FIG. 2) to substantially eliminate radiation effects on the signal processing unit 102. In one implementation, computing availability of the signal processing nodes $114_1$ to $114_N$ is based on a programmable alternating reconfiguration rate that substantially minimizes reconfiguration processing time. The alternating computing approach described here (including a programmable resynchronization timer) is implemented in the configuration management of the signal processing nodes $114_1$ to $114_N$ (described in further detail below with respect to FIG. 2).

Figure 2:
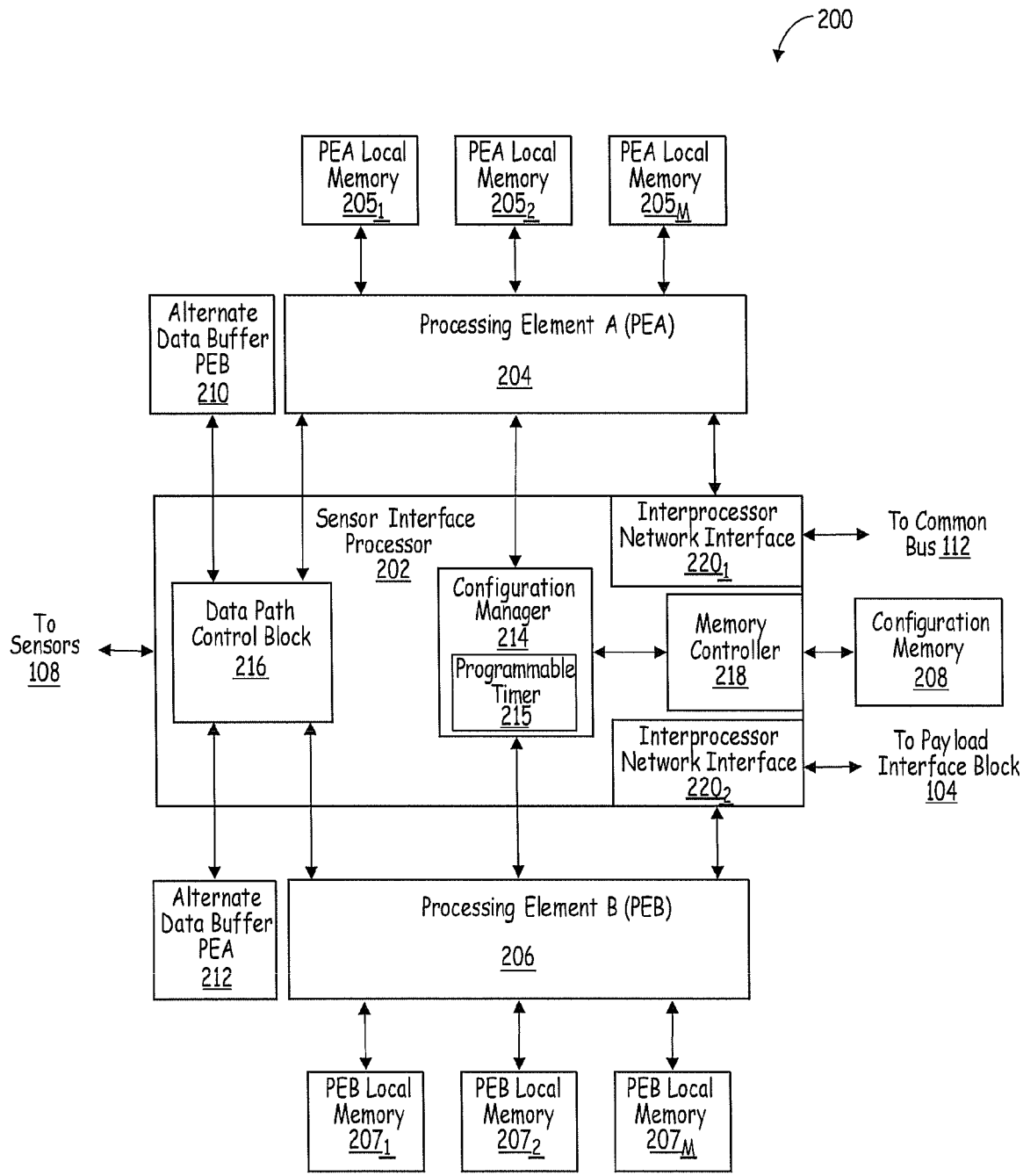
FIG. 2 is a block diagram of an embodiment of a signal processing node within the system of FIG. 1.

FIG. 2 is a block diagram of an embodiment of a signal processing node 200 within the system 100. In the example embodiment of FIG. 2, the signal processing node 200 represents one of the signal processing nodes 114 of FIG. 1. The signal processing node 200 comprises a set of at least two processing elements 204 and 206, a sensor interface processor 202 in communication with the set of processing elements 204 and 206, and a configuration memory 208 in communication with the sensor interface processor 202. In one implementation, the configuration memory 208 comprises a single set of program logic files. In one or more alternate implementations, one or more sets of program logic files reside in the configuration memory 208. The memory controller 218 sequences a particular (unique) operation of the signal processing node 200 with the one or more sets of program logic files. As further discussed below, during each reconfiguration sequence, the configuration manager 214 determines which of the program logic files within the configuration memory 208 to use in (re)configuring the processing elements 204 and 206.

The signal processing node 200 further comprises local memories $205_1$ to $205_M$ coupled to the processing element 204, and local memories $207_1$ to $207_M$ coupled to the processing element 206. In the example embodiment of FIG. 2, the processing element 204 is described in terms of a processing element A, and the processing element 206 is described in terms of a processing element B. Moreover, the processing element A is functionally substantially identical with respect to the processing element B. Each of the processing elements A and B are, without limitation, any programmable logic devices including a field-programmable gate array (FPGA), a complex programmable logic device (CPLD), and a field-programmable object array (FPOA). Each of the local memory devices 205 and 207 comprise, without limitation, at least one of quad data rate static random access memory (QDR SRAM) devices and dual data rate synchronous dynamic random access memory (DDR SDRAM) devices. It is understood that the signal processing node 200 is capable of accommodating any appropriate number of the processing elements 204 and 206 and corresponding local memories $205_1$ to $205_M$ and $207_1$ to $207_M$, respectively (for example, one or more series of local memories 205 and 207 coupled to one or more sets of processing elements 204 and 206) in a single signal processing node 200.

The sensor interface processor 202 processes sensor payload data from the one or more sensors 108 of FIG. 1. In the example embodiment of FIG. 2, the sensor interface processor 202 is a radiation hardened computing element (for example, an application-specific integrated circuit, or ASIC) that includes a configuration manager 214 to manage processing of the sensor payload data between the processing elements A and B. The configuration manager 214 further comprises a programmable timer 215 that signals the beginning of an alternate processing and reconfiguration interval. The sensor interface processor 202 further includes interprocessor network interfaces $220_1$ to $220_2$ and a memory controller 218. In one implementation, the interprocessor network interface $220_1$ communicates with the payload control computer 110 (via the common interface bus 112), and the interprocessor network interface $220_2$ is in communication with the payload interface block 104 of FIG. 1. The memory controller 218 is in communication with the configuration manager 214 and the configuration memory 208.

The signal processing node 200 further comprises alternate data buffers 210 and 212, each of the alternate data buffers 210 and 212 responsive to a data path control block 216. During reconfiguration of the processing element B, the alternate data buffer 210 (shown as alternate data buffer PEB) stores a current processing element state of the processing element B. Similarly, during reconfiguration of the processing element A, the alternate data buffer 212 (shown as alternate data buffer PEA) stores a current processing element state of the processing element A. The data path control block 216 transfers the current processing element state from the local memory devices $205_1$ to $205_M$ ($207_1$ to $207_M$) to the alternate data buffer 212 (210). The alternate data buffers 210 and 212 comprise, without limitation, at least one of QDR SRAM devices and DDR SDRAM devices. In the example embodiment of FIG. 2, the alternate data buffer 210 (212) comprises equivalent memory storage capacity as that of the local memory devices $205_1$ to $205_M$ ($207_1$ to $207_M$).

In operation, the sensor interface processor 202 periodically alternates processing between the processing elements A and B. For example, the configuration manager 214 reconfigures processing element A while processing element B continues to function. The memory controller 218 reconfigures one or more sets of processing logic from the configuration memory 208 between the processing elements A and B based on a programmable reconfiguration rate determined by the programmable timer 215. The data path control block 216 synchronizes operation of the processing elements A and B between alternating processing operations to substantially reduce radiation susceptibilities in the signal processing system of FIG. 1. In one implementation, the data path control block 216 restores operation of a (reconfigured) processing element A (B) within 100 ms using the alternate data buffer PEA (PEB) assigned to the processing elements A and B, respectively.

In the example embodiment of FIG. 2, the sensor interface processor 202 periodically reconfigures at least a portion of the processing elements A and B in an alternating fashion such that while the processing element A (B) is processing the sensor payload data, the processing element B (A) is reconfigured and any radiation-induced upsets are removed. The signal processing node 200 utilizes the sensor interface processor 202 (specifically, the configuration manager 214, the programmable timer 215, and the alternate data buffers 210 and 212 to periodically alternate reconfiguration of the processing elements A and B so that at least one of the processing elements A (B) continues to process sensor payload data. The alternate data buffers 210 and 212 resynchronize the reconfigured processing element A (B) with the processing element B (A) by restoring a current state of each of the reconfigured processing elements A and B. Periodic and planned reconfiguration and resynchronization within the computing architecture of FIG. 2 substantially minimizes reconfiguration processing time. In the implementation discussed above, the reconfiguration processing time is less than 100 ms.

Figure 3:
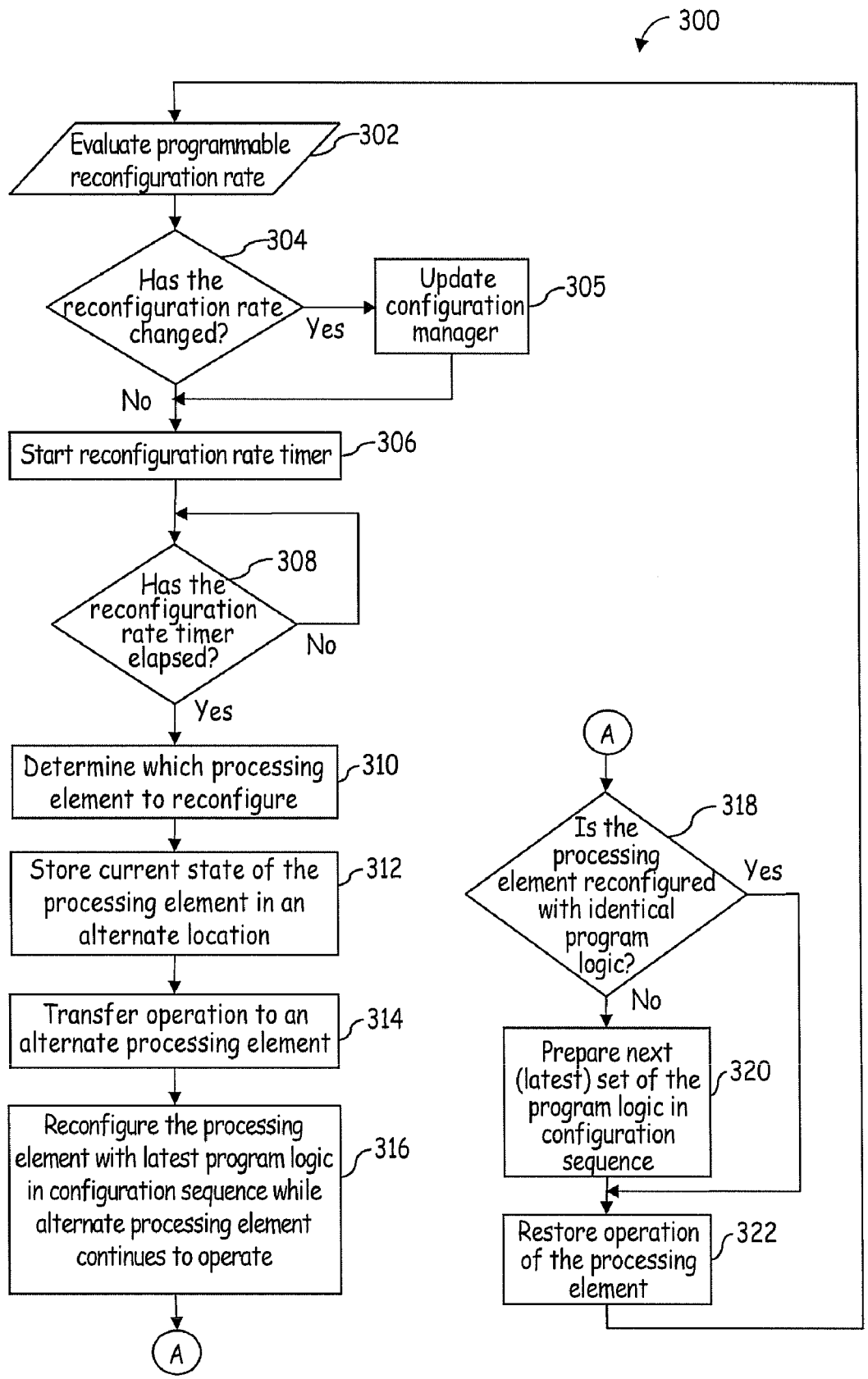
FIG. 3 is a flow diagram illustrating an embodiment of a method for reducing radiation effects in the signal processing node of FIG. 2.

FIG. 3 is a flow diagram illustrating a method 300 for reducing radiation effects in the signal processing unit 200 of FIG. 1. The method 300 addresses periodically transferring operation of the signal processing node 200 to the processing element 206 (204) by exchanging current state information of the processing element 204 (206) with the processing element 206 (204). The configuration manager 214 stores the current state information of the processing element 204 (206) in the alternate data buffer 212 (210). The data path control block 216 recalls a current state of the processing elements 204 (206) prior to reconfiguration of the processing element 204 (206) by sequencing a loading of individual program logic files from the configuration memory 208. In the example embodiment of FIG. 3, the configuration manager 214 alternates identical program logic files from the configuration memory 208 between the processing elements 204 and 206. Once the processing element 204 (206) is reconfigured, the sensor interface processor 202 synchronizes the (now-reconfigured) processing element 204 (206) with the processing element 206 (204). In the example embodiment of FIG. 3, the configuration manager 214 restores operation of the processing element 204 (206) within 100 ms.

At block 302, the configuration manager 214 evaluates the programmable reconfiguration rate in the programmable timer 215. If block 304 determines that the programmable reconfiguration rate has not been modified (alternatively, the reconfiguration rate is a fixed rate), the reconfiguration rate timer is started at block 306. If the programmable reconfiguration rate has been modified, the configuration manager 214 is updated at block 305. Once the reconfiguration rate timer expires (based on the programmable reconfiguration rate in the programmable timer 215) at block 308, the configuration manager 214 determines which of the processing elements of the signal processing node 200 to reconfigure at block 310. For example, if the processing element 204 was last reconfigured, the processing element 206 will be reconfigured. The data path control block 216 stores the current state of the processing element 206 in the alternate data buffer 210 at block 312. At block 314, the configuration manager 214 transfers operation of the signal processing node 200 to the processing element 204. At block 316, the configuration manager 214 reconfigures the processing element 206 with the latest program logic as indicated by the memory controller 218. The memory controller 218 transfers the latest program logic as one or more program logic files from the configuration memory 208. Before reconfiguration of the processing element 206 is complete, block 318 determines if the processing element 206 is being reconfigured with identical program logic as a previous reconfiguration of the processing element 206. If the current program logic is not identical, the memory controller 218 prepares the next set of the latest program logic files in the configuration sequence of the signal processing node 200 at block 320. At block 322, the configuration manager 214 restores operation of the processing element 206 by returning the current state information of the processing element 206 from the alternate data buffer 210.

While the methods and techniques described here have been described in the context of a fully functioning fault tolerant signal processing unit (for example, the signal processing unit 102 of FIG. 1), apparatus embodying these techniques are capable of being distributed in the form of a computer readable medium of instructions and a variety of forms that apply equally regardless of the particular type of signal bearing media actually used to carry out the distribution. Examples of computer readable media include recordable-type media, such as a portable memory device, a hard disk drive, a RAM, CD-ROMs, DVD-ROMs, and transmission-type media, such as digital and analog communications links, wired or wireless communications links using transmission forms, such as, for example, radio-frequency (RF) and light wave transmissions. The computer readable media may take the form of coded formats that are decoded for actual use in a particular fault tolerant signal processing unit.

This description has been presented for purposes of illustration, and is not intended to be exhaustive or limited to the form (or forms) disclosed. Variations and modifications may occur, which fall within the scope of the embodiments described above, as set forth in the following claims.

What is claimed is:

1. An electronic system, comprising:
one or more signal processing nodes, including:
a plurality of reconfigurable processing elements, each reconfigurable processing element substantially identical with respect to at least one other reconfigurable processing element;
a sensor interface processor in communication with the plurality of reconfigurable processing elements, the sensor interface processor including:
a configuration manager that manages processing between the plurality of reconfigurable processing elements, and
a memory controller in communication with the configuration manager;
one or more local memories coupled to each of the reconfigurable processing elements;
one or more alternate data buffers responsive to the sensor interface processor, each alternate data buffer storing a current processing element state from the one or more local memories during the periodic reconfiguration of each of the reconfigurable processing elements;
a data path control block, within the sensor interface processor, that transfers the current processing element state from each of the reconfigurable processing elements to the one or more alternate data buffers; and
a configuration memory responsive to the memory controller, the configuration memory comprising one or more sets of program logic; and
wherein the one or more signal processing nodes periodically alternate each of the reconfigurable processing elements between reconfiguration and signal processing;
a payload control computer in communication with the one or more signal processing nodes;
a payload interface block responsive to each of the signal processing nodes; and
one or more sensors individually coupled to each of the signal processing nodes.

2. The system of claim 1, and further comprising a power supply unit that supplies a plurality of secondary power signals to the one or more reconfigurable signal processing nodes and the payload control computer.

3. The system of claim 1, wherein the sensor interface processor is a radiation hardened computing element.

4. The system of claim 1, wherein each processing element is configured with the one or more sets of program logic from the configuration memory during a reconfiguration sequence.

5. The system of claim 1, wherein the configuration manager comprises a programmable timer that signals the beginning of an alternate processing and reconfiguration interval.

6. The system of claim 1, wherein the one or more reconfigurable signal processing nodes and the payload control computer communicate over a common interface bus.

7. The system of claim 1, wherein each of the one or more local memories is at least one of a quad data rate static random access memory and a dual data rate synchronous dynamic random access memory.

8. The system of claim 1, wherein the payload interface block receives processed payload data from the one or more signal processing nodes.

9. The system of claim 1, wherein each of the one or more sensors is at least one of a visible focal plane array, a guidance sensor, and an infrared focal plane array.

* * * * *